Dec. 10, 1957     L. TARWATER     2,815,788
ECCENTRIC LOCK NUT
Filed April 11, 1955

INVENTOR
LAWSON TARWATER
BY

ATTORNEYS

United States Patent Office 2,815,788
Patented Dec. 10, 1957

2,815,788
ECCENTRIC LOCK NUT

Lawson Tarwater, San Bernardino, Calif., assignor of fifty-one percent to Earl G. Witmer, Redlands, Calif.

Application April 11, 1955, Serial No. 500,420

2 Claims. (Cl. 151—19)

This invention has to do with lock nuts.

An object of the invention is to provide a novel and simple lock nut construction useful wherever the parts secured by a nut and bolt are subject to vibration, jarring or other forces having a tendency to loosen the nut.

Another object is to provide a lock nut which may be easily applied and removed and which can be reused.

A further object is to provide a lock nut embodying a main nut and an auxiliary nut secured together for limited relative rotation wherein the main and auxiliary nuts have interengaging faces which are eccentric to the axis of the bore holes through the nuts and act to tend to force the threaded bores of the nuts out of registration when the nuts are rotated relatively to each other in a given direction on a bolt.

Another object is to provide a self-locking lock nut.

These and other objects will be apparent from the drawing and the following description.

Referring to the drawing.

Figure 1:
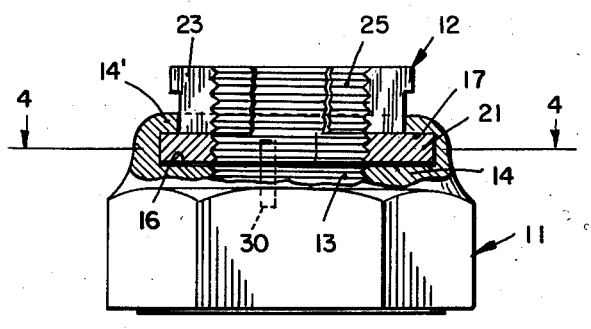
Fig. 1 is a sectional elevation view of a lock nut embodying the invention.
Figure 3:
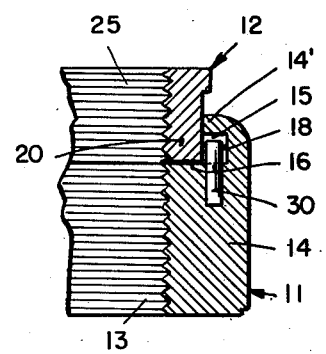
Fig. 3 is a fragmentary sectional view on line 3—3 of Fig. 2.
Figure 2:
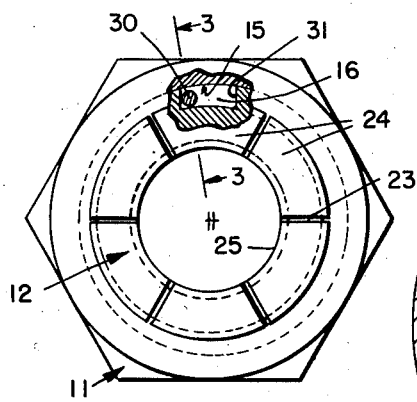
Fig. 2 is a plan view of the lock nut of Fig. 1.

More particularly describing the invention, 11 designates a main nut and 12 an auxiliary nut. The main nut has a conventional threaded bore 13 in the body 14 to receive a bolt. At its upper end the body is formed to provide a circular recess 15 which is defined by an axially facing shoulder 16, the inner face 17 of a rolled-over edge portion 14' of the body and a circular face 18.

The auxiliary nut has a body 20 which is provided with an external flange 21 at its inner end. The flange is received within the recess 15. Outwardly of the flange, body 20 is provided with a plurality of circumferentially spaced axial slits 23 which divide this portion of the body into a plurality of segments 24. The body has a threaded bore 25 therethrough. Preferably this bore is constricted somewhat in the region of the segments with relation to the bore 13 in the main nut, and this can be accomplished by bending the segments 24 slightly radially inward.

Figure 4:
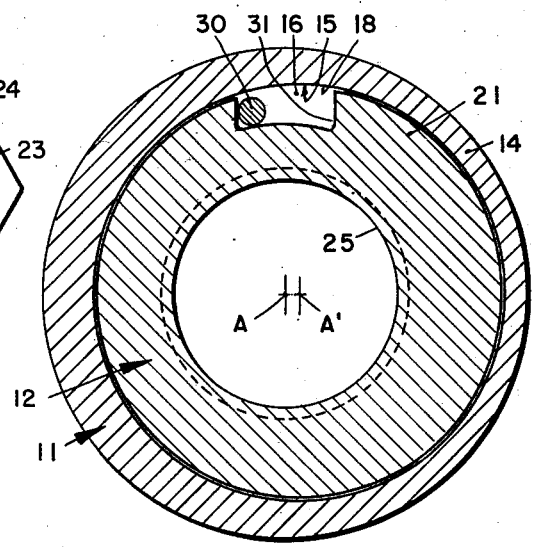
Fig. 4 is an enlarged, somewhat diagrammatic sectional view on line 4—4 of Fig. 1 showing the relation of the eccentric faces of the nuts to the bores.

As best shown in Fig. 4 the peripheral surface of the flange 21 is circular about an axis A' which is radially offset from the axis A of the bore so that the surface is thus eccentric to the axis of the bore. The same is true of the inner face 18 of the recess 15. The two nuts fit together with just sufficient clearance that they may be rotated relatively to each other without any difficulty. The nuts are provided with means for limiting relative rotation, and while this may take various forms, I have shown a pin 30 mounted in the body 14 of the main nut and extending axially into the recess 15. The pin is received in a recess 31 in the flange 21 of the auxiliary nut with sufficient clearance to permit limited relative rotation of the parts. When the nuts are disposed as shown in Fig. 4, the eccentric faces are correspondingly disposed and the threaded bores are aligned.

In use, the nut is threaded onto the bolt against a part to be held and as the main nut is tightened against the part, the auxiliary nut, which frictionally engages the bolt, tends to resist being advanced with the main nut with consequent camming action of the flange and recess. The camming action tends to misalign the bores of the nuts, thereby setting up an unusually good gripping action upon the bolt. The nut can be readily removed from the bolt by the application of force to the main nut in a direction to unthread it, and this movement returns the nuts to their original relative position, enabling them to be readily unthreaded.

Although I have illustrated and described a preferred form of my invention, I contemplate that various changes and modifications can be made therein without departing from the invention, the scope of which is indicated by the following claims. For example, in place of using the pin 30 in the main nut I may deform the main nut inwardly to partially enter the recess 31 in the auxiliary nut, or, a projection may be provided on the flange of the auxiliary nut and a cooperating recess in the main nut.

I claim:

1. A lock nut, comprising a main nut having a threaded bore therethrough, said nut having a circular smooth walled recess in its outer end portion, said recess being slightly eccentric with respect to the axis of the threaded bore through the nut, an auxiliary nut secured to said main nut for rotation relative thereto and having a circular flange at its inner end rotatively received in said recess, said flange being slightly eccentric with respect to the threaded bore through said auxiliary nut, and interengaging means on said nuts apart from said flange and said recess limiting relative rotation thereof, said nuts having their bores disposed on a common axis in one position and being relatively rotatable to a position such that said bores are not on a common axis when rotated relatively in a direction such that said main nut is threadedly advanced on a bolt and said auxiliary nut is threadedly retracted on the bolt, said auxiliary nut being formed with an axially slotted outer end portion forming segments defining a portion of said bore through said auxiliary nut which is more constricted than the bore through said main nut whereby to resiliently frictionally engage the bolt.

2. A lock nut as set forth in claim 1 in which said interengaging means comprises a pin in said main nut and a recess in the flange of said auxiliary nut receiving said pin.

References Cited in the file of this patent

UNITED STATES PATENTS

| | | |
|---|---|---|
| 798,576 | Exley | Aug. 29, 1905 |
| 987,106 | Blanton | Mar. 21, 1911 |
| 1,275,182 | Ross | Aug. 6, 1918 |
| 2,301,634 | Nicholay | Nov. 10, 1942 |
| 2,333,290 | Brackett | Nov. 2, 1943 |
| 2,569,989 | Harding | Oct. 2, 1951 |

FOREIGN PATENTS

| | | |
|---|---|---|
| 586,083 | Great Britain | Mar. 6, 1947 |
| 592,688 | Great Britain | Sept. 25, 1947 |